United States Patent
Traisilanun et al.

(10) Patent No.: US 10,913,041 B2
(45) Date of Patent: Feb. 9, 2021

(54) MULTIMODAL POLYETHYLENE SCREW CAP

(71) Applicants: Thai Polyethylene Co., Ltd., Bangkok (TH); SCG Chemicals Co., Ltd., Bangkok (TH)

(72) Inventors: Saranya Traisilanun, Bangkok (TH); Watcharee Cheevasrirungruang, Bangkok (TH); Warachad Klomkamol, Bangkok (TH)

(73) Assignees: Thai Polyethylene Co., Ltd., Bangkok (TH); SCG Chemicals Co., Ltd., Bangkok (TH)

(*) Notice: Subject to any disclaimer, the term of this patent is extended or adjusted under 35 U.S.C. 154(b) by 15 days.

(21) Appl. No.: 16/332,066

(22) PCT Filed: Sep. 8, 2017

(86) PCT No.: PCT/EP2017/072593
§ 371 (c)(1),
(2) Date: Mar. 11, 2019

(87) PCT Pub. No.: WO2018/046667
PCT Pub. Date: Mar. 15, 2018

(65) Prior Publication Data
US 2020/0079938 A1 Mar. 12, 2020

(30) Foreign Application Priority Data
Sep. 12, 2016 (EP) .................. 16188337

(51) Int. Cl.
*C08F 2/01* (2006.01)
*C08F 110/02* (2006.01)
*C08L 23/06* (2006.01)
*B01J 8/00* (2006.01)
*B01J 8/22* (2006.01)
(Continued)

(52) U.S. Cl.
CPC ............ *B01J 8/008* (2013.01); *B01J 8/22* (2013.01); *C08F 2/01* (2013.01); *C08F 2/18* (2013.01); *C08F 110/02* (2013.01); *C08L 23/06* (2013.01); *B01J 2219/0004* (2013.01); *B65D 41/04* (2013.01); *C08F 2500/01* (2013.01); *C08F 2500/02* (2013.01); *C08F 2500/05* (2013.01); *C08F 2500/18* (2013.01);
(Continued)

(58) Field of Classification Search
CPC ...... C08F 2/01; C08F 2/12; C08F 2/00; C08F 2/18; C08F 110/02; C08F 110/06; C08F 210/16; C08F 2/001; C08F 2500/01; C08F 2500/02; C08F 2500/05; C08F 2500/12; C08F 2500/17; C08F 2500/18; C08L 23/04; C08L 23/06; C08L 23/0815; C08L 2297/068; C08L 2205/025; C08L 2205/03; C08L 2207/068; B01D 19/0068; C08J 5/18; C08J 2423/08; C08J 2423/06; B01J 8/008; B01J 8/22; B01J 2219/0004; B65D 41/04
See application file for complete search history.

(56) References Cited

U.S. PATENT DOCUMENTS 6,291,601 B1  9/2001  Debras
6,713,561 B1  3/2004  Berthold et al.
(Continued)

FOREIGN PATENT DOCUMENTS

EP  1041113 A1  10/2000
EP  1201713 A1  5/2002
(Continued)

OTHER PUBLICATIONS

Dec. 15, 2017—International Search Report and Written Opinion—International Appl. PCT/EP2017/072593.

*Primary Examiner* — Nathan M Nutter
(74) *Attorney, Agent, or Firm* — Banner & Witcoff, Ltd.

(57) ABSTRACT

The present invention relates to a multimodal polyethylene composition comprising: (A) 35 to 65 parts by weight, preferably 45 to 65 parts by weight, most preferred 50 to 60 parts by weight, of the low molecular weight polyethylene having a weight average molecular weight (Mw) of 20,000 to 90,000 g/mol; (B) 5 to 40 parts by weight, preferably 5 to 30 parts by weight, most preferred 5 to 20 parts by weight, of the first high molecular weight polyethylene having a weight average molecular weight (Mw) of more than 150,000 to 1,000,000 g/mol or the first ultra high molecular weight polyethylene having a weight average molecular weight (Mw) of more than 1,000,000 to 5,000,000 g/mol; and (C) 20 to 60 parts by weight, preferably 25 to 60 parts by weight, most preferred 35 to 55 parts by weight, of the second high molecular weight polyethylene having a weight average molecular weight (Mw) of more than 150,000 to 1,000,000 g/mol or the second ultra high molecular weight polyethylene having a weight average molecular weight (Mw) of more than 1,000,000 to 5,000,000 g/mol, wherein the molecular weight distribution of the multimodal polyethylene composition is from 10 to 25, preferably 10 to 20, determined by Gel Permeation Chromatography; the isothermal crystallization half-time of the multimodal polyethylene composition at a temperature of 123° C. is 7 min or less, preferably 6 min or less, preferably 2-6 min, according to Differential Scanning Calorimetry; and a spiral flow length at a temperature of 220° C. is at least 200 mm, preferably 250-400 mm and a screw cap comprising the same.

20 Claims, No Drawings

(51) Int. Cl.
*C08F 2/18* (2006.01)
*B65D 41/04* (2006.01)

(52) U.S. Cl.
CPC ..... *C08L 2205/025* (2013.01); *C08L 2205/03* (2013.01); *C08L 2207/068* (2013.01)

(56) References Cited

U.S. PATENT DOCUMENTS

| | | |
|---|---|---|
| 6,716,936 B1 | 4/2004 | McGrath et al. |
| 8,759,448 B2 | 6/2014 | Buryak et al. |
| 8,802,768 B2 | 8/2014 | Dotsch et al. |
| 2003/0191251 A1 | 10/2003 | McGrath |
| 2004/0204542 A1 | 10/2004 | Mattioli et al. |
| 2006/0074194 A1 | 4/2006 | Berthold et al. |
| 2009/0105422 A1 | 4/2009 | Berthold et al. |
| 2009/0163679 A1 | 6/2009 | Do Nascimento et al. |
| 2009/0304966 A1 | 12/2009 | Mehta et al. |
| 2010/0010163 A1 | 1/2010 | Berthold et al. |
| 2010/0016526 A1 | 1/2010 | Etherton et al. |
| 2010/0035008 A1 | 2/2010 | Backman |
| 2010/0092709 A1 | 4/2010 | Joseph |
| 2010/0152383 A1 | 6/2010 | Jiang et al. |
| 2010/0301054 A1 | 12/2010 | Berthold et al. |
| 2014/0030460 A1 | 1/2014 | Monoi et al. |
| 2015/0051364 A1 | 2/2015 | Vahteri et al. |
| 2018/0022905 A1* | 1/2018 | Buryak et al. ........... C08L 23/04 525/240 |
| 2019/0374919 A1* | 12/2019 | Traisilanun et al. ......................... C08F 110/02 |

FOREIGN PATENT DOCUMENTS

| | | |
|---|---|---|
| EP | 1460105 A1 | 9/2004 |
| EP | 1417260 B1 | 8/2005 |
| EP | 1578862 B1 | 9/2005 |
| EP | 1655334 A1 | 5/2006 |
| EP | 1576047 B1 | 7/2006 |
| EP | 1576049 B1 | 7/2006 |
| EP | 2017302 A1 | 1/2009 |
| EP | 2130863 A1 | 12/2009 |
| EP | 2354184 A1 | 8/2011 |
| EP | 2407506 A1 | 1/2012 |
| EP | 2365995 B1 | 12/2012 |
| EP | 2743305 A1 | 6/2014 |
| EP | 2668231 B1 | 10/2014 |
| EP | 2907843 A1 | 8/2015 |
| HU | 0800771 A2 | 10/2010 |
| JP | 2012-067914 A | 4/2012 |
| WO | 9618677 A1 | 6/1996 |
| WO | 2004056921 A1 | 7/2004 |
| WO | 2006092377 A1 | 9/2006 |
| WO | 2006092378 A1 | 9/2006 |
| WO | 2006092379 A1 | 9/2006 |
| WO | 2007003530 A1 | 1/2007 |
| WO | 2007042216 A1 | 4/2007 |
| WO | 2007045415 A1 | 4/2007 |
| WO | 2008006487 A1 | 1/2008 |
| WO | 2008049551 A1 | 5/2008 |
| WO | 2008131817 A1 | 11/2008 |
| WO | 2009003627 A1 | 1/2009 |
| WO | 2009077142 A1 | 6/2009 |
| WO | 2009147022 A1 | 12/2009 |
| WO | 2010025342 A2 | 3/2010 |
| WO | 2012069400 A1 | 5/2012 |
| WO | 2013101767 A2 | 7/2013 |
| WO | 2013113797 A1 | 8/2013 |
| WO | 2013144324 A1 | 10/2013 |
| WO | 2013144328 A1 | 10/2013 |
| WO | 2014091501 A1 | 6/2014 |
| WO | 2015121161 A1 | 8/2015 |

* cited by examiner

MULTIMODAL POLYETHYLENE SCREW CAP

CROSS-REFERENCE TO RELATED APPLICATIONS

This application is a U.S. National Stage application under 35 U.S.C. § 371 of International Application PCT/EP2017/072593 (published as WO 2018/046667 A1), filed Sep. 8, 2017, which claims the benefit of priority to Application EP 16188337.6, filed Sep. 12, 2016. Benefit of the filing date of each of these prior applications is hereby claimed. Each of these prior applications is hereby incorporated by reference in its entirety.

The present invention relates to a multimodal polyethylene composition for producing screw cap.

The demand of polyethylene resins is increasingly being used in a variety of applications. As required high performance of polyethylene for a relatively new plastic, a polymerization process technology has been developed to support new polymeric material production. In order for balancing processability and physical properties of ethylene copolymers, the development in multimodal polymerization process has been investigated.

In the prior art, multimodal polyethylene polymerization is employed to produce polymers having different molecular weights by creating each resin fraction in separated reactors. A low molecular weight fraction is produced in a reactor using an excess of hydrogen to control the molecular weight of the polymer suitable for providing good processability of the final polymer. A high molecular weight fraction which has an influence on the physical properties and is produced under polymerization conditions with low hydrogen concentration. It is well known in the art that low molecular weight polymer is preferably produced in a first reactor. To obtain a multimodal polymer with good physical properties, all hydrogen from the first reactor should be removed before the polymerized slurry polymer is passed to a second reactor in which the production of high molecular weight polymer takes place.

It is an object to provide a multimodal polyethylene composition overcoming drawbacks of the prior art, in particular having improved mechanical properties, such as Charpy index, crystallization time, and spiral flow lenght.

Screw caps, for example beverage screw caps and other closures, which are in particularly used to cap beverage bottles, especially bottles for carbonated soft drinks, are known in the art. In particular, there is a variety of polyethylene compositions for preparing such screw caps.

WO 2009/077142 A1 discloses a polyethylene molding composition for producing injection-molded screw caps and closures, in particular for use together with containers for carbonated beverage products.

WO 2007/003530 A1 discloses polyethylene molding compositions for producing injection-molded finished parts. The composition is described to be suitable for producing, for example, closures and bottles. Further described is a use of a multimodal polyethylene composition.

U.S. Pat. No. 8,759,448 B2 is related to a polyethylene molding composition having a multimodal molecular weight distribution. It is proposed to use the disclosed composition for preparing caps and closures, transport packaging, houseware and thin wall packaging applications.

EP 2365995 B1 discloses a multimodal polyethylene composition and the use thereof for preparing a single-piece bottle cap. The multimodal polyethylene composition add nucleating agent to get faster crystallization rate and altered stress cracking resistance.

However, also in light of the above prior art, there is still the need to provide improved caps, in particular screw caps, and polymer compositions for preparing the same overcoming drawbacks of the prior art, in particular to provide polymer compositions for preparing caps having better processability, excellent flowability, high stiffness and high environmental stress-cracking resistance (ESCR).

It is therefore a object of the present invention to provide improved caps and multimodal polyethylene compositions.

This object is achieved in accordance with the invention according to the subject-matter of the independent claims. Preferred embodiments result from the sub-claims.

The object is achieved by a multimodal polyethylene composition comprising;

(A) 35 to 65 parts by weight, preferably 45 to 65 parts by weight, most preferred 50 to 60 parts by weight, of the low molecular weight polyethylene having a weight average molecular weight (Mw) of 20,000 to 90,000 g/mol;

(B) 5 to 40 parts by weight, preferably 5 to 30 parts by weight, most preferred 5 to 20 parts by weight, of the first high molecular weight polyethylene having a weight average molecular weight (Mw) of more than 150,000 to 1,000,000 g/mol or the first ultra high molecular weight polyethylene having a weight average molecular weight (Mw) of more than 1,000,000 to 5,000,000 g/mol; and (C) 20 to 60 parts by weight, preferably 25 to 60 parts by weight, most preferred 35 to 55 parts by weight, of the second high molecular weight polyethylene having a weight average molecular weight (Mw) of more than 150,000 to 1,000,000 g/mol or the second ultra high molecular weight polyethylene having a weight average molecular weight (Mw) of more than 1,000,000 to 5,000,000 g/mol, wherein the molecular weight distribution of the multimodal polyethylene composition is from 10 to 25, preferably 10 to 20, determined by Gel Permeation Chromatography;

the isothermal crystallization half-time of the multimodal polyethylene composition at a temperature of 123° C. is 7 min or less, preferably 6 min or less, preferably 2-6 min, according to Differential Scanning Calorimetry; and a spiral flow length at a temperature of 220° C. is at least 200 mm, preferably 250-400 mm.

In a preferred embodiment, the multimodal polyethylene composition has a weight average molecular weight from 80,000 to 250,000 g/mol, preferably 80,000 to 200,000 g/mol, measured by Gel Permeation Chromatography.

Furthermore, it is preferred that the multimodal polyethylene composition has a number average molecular weight from 5,000 to 30,000 g/mol, preferably 5,000 to 20,000 g/mol, measured by Gel Permeation Chromatography.

Preferably, the multimodal polyethylene composition has a Z average molecular weight from 700,000 to 2,500,000 g/mol, preferably 700,000 to 2,000,000 g/mol, and more preferably 700,000 to 1,500,000 g/mol measured by Gel Permeation Chromatography.

Preferably, the multimodal polyethylene composition has a density 0.950 to 0.965 g/cm$^3$, preferably 0.953 to 0.960 g/cm$^3$, according to ASTM D 1505 and/or MI$_2$ from 0.1 to 20 g/10 min, preferably from 0.3 to 17 g/10 min, according to ASTM D 1238.

Preferably, the multimodal polyethylene composition has a molecular weight distribution of 15 to 25, preferably 15 to 20.

Preferably, the spiral flow length at a temperature of 220° C. is from 250 to 370 mm.

The object is further achieved by a screw cap comprising the multimodal polyethylene composition according to the invention.

In this regard, a screw cap (or screw closure) is a mechanical device which is screwed on and off a "finish" on a container. It must be engineered to provide an effective seal (and barrier), to be compatible with the contents, to be easily opened by the consumer, often to be recloseable, and to comply with product and package. A screw cap is a common type of closure for bottles, jars and tubes.

Most preferred, the screw cap is obtained by injection molding or compression molding.

Regarding the inventive screw cap, it is preferred that the screw cap substantially comprises the inventive multimodal polyethylene composition, which means that the screw cap does comprise further constituents only in amounts which do not affect the cap performances regarding processability (in particular cycle time), flowability, stiffness and stress crack resistance. Most preferred, the screw cap is consisting of the inventive multimodal polyethylene composition.

In preferred embodiments of the inventive reactor system, the inventive process and the inventive multimodal polyethylene composition "comprising" is "consisting of".

In preferred embodiments "parts by weight" is "percent by weight".

This object is further achieved by a process for producing a multimodal polyethylene composition in an inventive reactor system, comprising (in this sequence);

(a) polymerizing ethylene in an inert hydrocarbon medium in the first reactor in the presence of a catalyst system, selected from Ziegler-Natta catalyst or metallocene, and hydrogen in an amount of 0.1-95% by mol with respect to the total gas present in the vapor phase in the first reactor to obtain a low molecular weight polyethylene or a medium molecular weight polyethylene;

(b) removing in the hydrogen removal unit 98.0 to 99.8% by weight of the hydrogen comprised in a slurry mixture obtained from the first reactor at a pressure in the range of 103-145 kPa (abs) and transferring the obtained residual mixture to the second reactor;

(c) polymerizing ethylene and optionally $C_{4-12}$ α-olefin comonomer in the second reactor in the presence of a catalyst system, selected from Ziegler-Natta catalyst or metallocene, and in the presence of hydrogen in an amount obtained in step (b) to obtain a first high molecular weight polyethylene or a first ultra high molecular weight polyethylene in the form of a homopolymer or a copolymer and transferring a resultant mixture to the third reactor; and (d) polymerizing ethylene and optionally $C_{4-12}$ α-olefin comonomer in the third reactor in the presence of a catalyst system, selected from Ziegler-Natta catalyst or metallocene, and hydrogen, wherein the amount of hydrogen in the third reactor is in a range of 0.1-70% by mol, preferably 0.1-60% by mol, with respect to the total gas present in the vapor phase in the third reactor or optionally substantial absence of hydrogen to obtain a second high molecular weight polyethylene or a second ultra high molecular weight polyethylene homopolymer or copolymer.

"Substantial absence" in this regard means that hydrogen is only comprised in the third reactor in an amount which cannot be avoided by technical means.

The slurry mixture obtained from the first reactor and subjected to the step of removing hydrogen in the hydrogen removal unit contains all of the solid and liquid constituents obtained in the first reactor, in particular the low molecular weight polyethylene or the medium molecular weight polyethylene. Furthermore, the slurry mixture obtained from the first reactor is saturated with hydrogen regardless the amount of hydrogen used in the first reactor.

Preferably, the removing is removing of 98.0 to 99.8% by weight of the hydrogen, and more preferable 98.0 to 99.5% by weight, most preferred 98.0 to 99.1.

Preferably, the α-comonomer comprised in the second reactor and/or in the third reactor is selected from 1-butene and/or 1-hexene.

Preferably, the operation pressure of the hydrogen removal unit is in the range of 103-145 kPa (abs) and more preferably 104-130 kPa (abs), most preferred 105 to 115 kPa (abs).

Preferably, step (a) results in the low molecular weight polyethylene or medium molecular weight polyethylene, step (c) results in high molecular weight polyethylene or the ultra high molecular weight polyethylene, and step (d) results in high molecular weight polyethylene or the ultra high molecular weight polyethylene.

The weight average molecular weight (Mw) of the low molecular weight polyethylene, the medium molecular weight polyethylene, the high molecular weight polyethylene and the ultra high molecular weight polyethylene described herein are in the range of 20,000-90,000 g/mol (low), more than 90,000-150,000 g/mol (medium), more than 150,000-1,000,000 g/mol (high) and more than 1,000,000-5,000,000 g/mol (ultra high), respectively.

Regarding the inventive screw cap, it is preferred that the screw cap substantially comprises the inventive multimodal polyethylene composition, which means that the screw cap does comprise further constituents only in amounts which do not affect the cap performances regarding processability (in particular cycle time), flowability, stiffness and stress crack resistance. Most preferred, the screw cap is consisting of the inventive multimodal polyethylene composition.

In preferred embodiments of the inventive reactor system, the inventive process and the inventive multimodal polyethylene composition "comprising" is "consisting of".

In preferred embodiments "parts by weight" is "percent by weight".

The above embodiments mentioned to be preferred resulted in even more improved mechanical properties of the obtained multimodal polyethylene composition and the screw caps prepared therefrom. Best results were achieved by combining two or more of the above preferred embodiments. Likewise, the embodiments mentioned above to be more or most preferred resulted in the best improvement of mechanical properties.

Surprisingly, it was found that using the specific multimodal polyethylene composition enhance the superior properties for screw cap and closure, in particular to processability (fast cycle time), flowability, stiffness and stress crack resistance.

The catalyst for producing the multimodal polyethylene resin of this invention is selected from a Ziegler-Natta catalyst, a single site catalyst including metallocene-bases catalyst and non-metallocene-bases catalyst or chromium based might be used, preferably conventional Ziegler-Natta catalyst or single site catalyst. The catalyst is typically used together with cocatalysts which are well known in the art.

Innert hydrocarbon is preferably aliphatic hydrocarbon including hexane, isohexane, heptane, isobutane. Preferably, hexane (most preferred n-hexane) is used. Coordination catalyst, ethylene, hydrogen and optionally α-olefin comonomer are polymerized in the first reactor. The entire product obtained from the first reactor is then transferred to the hydrogen removal unit to remove 98.0 to 99.8% by weight of hydrogen, unreacted gas and some volatiles before being fed to the second reactor to continue the polymerization. The polyethylene obtained from the second reactor is a bimodal polyethylene which is the combination of the product obtained from the first reactor and that of the second reactor. This bimodal polyethylene is then fed to the third reactor to continue the polymerization. The final multimodal (trimodal) polyethylene obtained from the third reactor is the mixture of the polymers from the first, the second and the third reactor.

The polymerization in the first, the second and the third reactor is conducted under different process conditions. These can be the variation in concentration of ethylene and hydrogen in the vapor phase, temperature or amount of comonomer being fed to each reactor. Appropriate conditions for obtaining a respective homo- or copolymer of desired properties, in particularly of desired molecular weight, are well known in the art. The person skilled in the art is enabled on basis of his general knowledge to choose the respective conditions on this basis. As a result, the polyethylene obtained in each reactor has a different molecular weight. Preferably, low molecular weight polyethylene or medium molecular weight polyethylene is produced in the first reactor, while high molecular weight polyethylene or ultra high molecular weight polyethylene is produced in the second and third reactor respectively.

The term first reactor refers to the stage where the low molecular weight polyethylene (LMW) or the medium molecular weight polyethylene (MMW) is produced. The term second reactor refers to the stage where the first high or ultra high molecular weight polyethylene (HMW1) is produced. The term third reactor refers to the stage where the second high molecular weight polyethylene or ultra high molecular weight (HMW2) is produced.

The term LMW refers to the low molecular weight polyethylene polymer polymerized in the first reactor having a weight average molecular weight (Mw) of 20,000-90,000 g/mol.

The term MMW refers to the medium molecular weight polyethylene polymer polymerized in the first reactor having a weight average molecular weight (Mw) of more than 90,000-150,000 g/mol.

The term HMW1 refers to the high or ultra high molecular weight polyethylene polymer polymerized in the second reactor having a weight average molecular weight (Mw) of more than 150,000 to 5,000,000 g/mol.

The term HMW2 refers to the high or ultra high molecular weight polyethylene polymer polymerized in the third reactor having the weight average molecular weight (Mw) of more than 150,000 to 5,000,000 g/mol.

The LMW or MMW is produced in the reactor, the absence of comonomer in order to obtain a homopolymer.

To obtain the improved polyethylene properties of this invention, ethylene is polymerized in the first reactor in the absence of comonomer in order to obtain high density LMW polyethylene or MMW polyethylene having density ≥0.965 g/cm$^3$ and MI$_2$ in the range of 10 to 1000 g/10 min for LMW and 0.1 to 10 g/10 min for MMW. In order to obtain the target density and MI in the first reactor, the polymerization conditions are controlled and adjusted. The temperature in the first reactor ranges from 70-90° C., preferably 80-85° C. Hydrogen is fed to the first reactor so as to control the molecular weight of the polyethylene. The first reactor is operated at pressure between 250 and 900 kPa, preferably 400-850 kPa. An amount of hydrogen present in the vapor phase of the first reactor is in the range of 0.1-95% by mole, preferably 0.1-90% by mol.

Before being fed to the second reactor, the slurry obtained from the first reactor containing LMW or MMW polyethylene preferably in hexane is transferred to a hydrogen removal unit which may have a flash drum connected with depressurization equipment preferably including one or the combination of vacuum pump, compressor, blower and ejector where the pressure in the flash drum is reduced so that volatile, unreacted gas, and hydrogen are removed from the slurry stream. The operating pressure of the hydrogen removal unit typically ranges from 103-145 kPa (abs), preferably 104-130 kPa (abs) in which 98.0 to 99.8% by weight of hydrogen can be removed, preferably 98.0 to 99.5% by weight and most preferred 98.0 to 99.1% by weight.

In this invention, when 98.0 to 99.8% by weight of hydrogen is removed and the polymerization undergoes under these conditions of hydrogen content, very high molecular weight polymer can be achieved this way and Charpy Impact and Flexural Modulus are improved. It was surprisingly found that working outside the range of 98.0 to 99.8% by weight of hydrogen removal, the inventive effect of obtaining very high molecular weight polymer and improving Charpy Impact an Flexural Modulus could not be observed to the same extend. The effect was more pronounced in the ranges mentioned to be preferred.

The polymerization conditions of the second reactor are notably different from that of the first reactor. The temperature in the second reactor ranges from 65-90° C., preferably 68-80° C. The molar ratio of hydrogen to ethylene is not controlled in this reactor since hydrogen is not fed into the second reactor. Hydrogen in the second reactor is the hydrogen left over from the first reactor that remains in slurry stream after being flashed at the hydrogen removal unit. Polymerization pressure in the second reactor ranges from 100-3000 kPa, preferably 150-900 kPa, more preferably 150-400 kPa.

Hydrogen removal is the comparison result of the amount of the hydrogen present in the slurry mixture before and after passing through the hydrogen removal unit. The calculation of hydrogen removal is performed according to the measurement of gas composition in the first and the second reactor by gas chromatography.

After the substantial amount of hydrogen is removed, the concentration, slurry from the hydrogen removal unit is transferred to the second reactor to continue the polymerization. In this reactor, ethylene can be polymerized with or without α-olefin comonomer to form HMW1 polyethylene in the presence of the LMW polyethylene or MMW polyethylene obtained from the first reactor. The α-olefin comomer that is useful for the copolymerization includes $C_{4-12}$, preferably 1-butene and 1-hexene.

After the polymerization in the second reactor, the slurry obtained is transferred to the third reactor to continue the polymerization.

The HMW2 is produced in the third reactor by copolymerizing ethylene with optionally α-olefin comonomer at the presence of LMW or MMW and HWM1 obtained from the first and second reactor. The α-olefin comonomer that is useful for the copolymerization include $C_{4-12}$, preferably 1-butene and/or 1-hexene.

In order to obtain the target density and the target MI in the third reactor, the polymerization conditions are controlled and adjusted. However, the polymerization conditions of the third reactor are notably different from the first and second reactor. The temperature in the third reactor ranges from 68-90° C. preferably 68-80° C. Hydrogen is fed to the third reactor so as to control the molecular weight of polyethylene. Polymerization pressure in the third reactor ranges from 150-900 kPa, preferably 150-600 kPa, and is controlled by the addition of inert gas such as nitrogen.

The amount of LMW or MMW present in the multimodal polyethylene composition of the present invention is 30-65 parts by weight. HMW1 present in the polyethylene of the present invention is 5-40 parts by weight and HMW2 present in the polyethylene of the present invention is 10-60 parts by weight. It is possible that HMW1>HMW2 or HMW1<HMW2 depending on the polymerization conditions employed.

The final (free-flow) multimodal polyethylene composition is obtained by separating hexane from the slurry discharged from the third reactor.

The resultant polyethylene powder may then be mixed with antioxidants and optionally additives before being extruded and granulated into pellets.

Definition and Measurement Methods

Melt flow index: Melt flow index (MI) of polymer was measured according to ASTM D 1238 and indicated in g/10 min that determines the flowability of polymer under testing condition at 190° C. with load 2.16 kg ($MI_2$), 5 kg ($MI_5$) and 21.6 kg ($M_{21}$).

Density: Density of polyethylene was measured by observing the level to which a pellet sinks in a liquid column gradient tube, in comparison with standards of known density. This method is determination of the solid plastic after annealing at 120° C. follow ASTM D 1505.

Molecular weight and Polydispersity index (PDI): The weight average molecular weight (Mw), the number average molecular weight (Mn) and the Z average molecular weight ($M_Z$) in g/mol in g/mol were analysed by gel permeation chromatography (GPC). Polydispersity index was calculated by Mw/Mn. Around 8 mg of sample was dissolved in 8 ml of 1,2,4-trichlorobenzene at 160° C. for 90 min. Then the sample solution, 200 µl, was injected into the high temperature GPC with IR5, an infared detector (Polymer Char, Spain) with flow rate of 0.5 ml/min at 145° C. in column zone and 160° C. in detector zone. The data was processed by GPC One® software, Polymer Char, Spain.

Intrinsic Viscosity (IV): The test method covers the determination of the dilute solution viscosity of polyethylene at 135° C. or an ultra high molecular weight polyethylene (UHMWPE) at 150° C. The polymeric solution was prepared by dissolving polymer in Decalin with 0.2% wt/vol stabilizer (Irganox 1010 or equivalent). The details are given for the determination of IV according to ASTM D 2515.

Comonomer content: The comonomer content was determined by high resolution $^{13}$C-NMR. 13C-NMR spectra were recorded by 500 MHz ASCEND™, Bruker, with cryogenic 10 mm probe. TCB was used as major solvent with TCE-d2 as locking agent in the ratio of 4:1 by volume. The NMR experiments were carried on at 120° C., and the inverse gate 13C (zgig) of pulse program with 90° for pulse angle were used. The delay time (D1) was set to 10 seconds for full-spin recovery.

Crystallinity: The crystallinity is frequently used for characterization by Differential Scanning Calorimetry (DSC) follow ASTM D 3418. Samples were identified by peak temperature and enthalpy, as well as the % crystallinity was calculated from the peak area.

Shear Thinning Index (SHI): It gives an indication as molecular weight distribution of material. A common measurement runs viscosity at 190° C. using Dynamic rheometer using 25 mm diameter plate and plate geometry 1 mm gap. SHI (1/100) was calculated by viscosities at a constant shear stress at 1 kPa and 100 kPa. Generally materials have high SHI means better flowability of material.

Viscosity at angular frequency 0.01 [1/s] ($\eta_{0.01}$): Rheological parameters are determined by using controlled stress rheometer model MCR-301 from Anton-Paar. The geometry is Plate-Plate 25 mm diameter at the measurement gap 1 mm. The dynamic oscillatory shear performs at angular frequency (w) 0.01-600 rad/s at 190° C. under nitrogen atmosphere. The sample preparation is performed to circular disk 25 mm by compression molding at 190° C. Viscosity at 0.01 [1/s] ($\eta_{0.01}$) is obtained from complex viscosity at a specific shear rate 0.01 [1/s].

Isothermal Crystallization Half-Time (ICHT) and Crystal growth rate constant (K): The isothermal crystallization half-time at 123° C. was measured by differential scanning calorimetry (DSC) to determine the crystallization rate of the sample. The sample was heated from 30° C. to 200° C. at a heating rate of 50° C./min and held for 5 min. Then, it was cooled down to 123° C. at cooling rate 50° C./min and held for 60 min. The crystal growth rate constant (K) and n were determined by fitting the data of logarithmic expression of Avrami equation.

Spiral flow length: Spiral flow test was carried out by Fanuc Roboshot S2000i 100B injection molding machine (Screw diameter 36 mm) with spiral mould at temperature 220° C. and constant injection pressure 1000 bar. The thickness of specimen is 1 mm. After conditioning sample for 24 hr, the spiral flow length (mm) was measured.

Charpy impact strength: The compressed specimen according to ISO 293 was prepared. Charpy impact strength is determined according to ISO179 at 23° C. and shown in the unit $kJ/m^2$.

Flexural Modulus: The compressed specimen according to ISO 1872-2 was prepared and performed the test follow ISO 178. The flexural tests were done using a universal testing machine equipped with three point bending fixture.

Full Notch Creep Test (FNCT): The full notch creep test according to ISO 16770 was the preferred way of measuring the stress crack resistance of a polymer at constant stress of 6 MPa at 50° C. in 2% Arkopal solution (N=100). The samples were cut from 6 mm thickness plaques by compression molding follow ISO 1872-2. The specimen (Type C) dimension was 90 mm×6 mm×6 mm with notch depth of 1 mm. The failure time is recorded in hr.

EXPERIMENTAL AND EXAMPLES

Composition-Related Examples

The medium or high density polyethylene preparation was carried out in three reactors in series. Ethylene, hydrogen, hexane, catalyst and TEA (triethyl aluminum) co-catalyst were fed into a first reactor in the amounts shown in Table 1. A commercial available Ziegler-Natta catalyst was used. The catalyst preparation is for example described in Hungary patent application 0800771r.

The polymerization in first reactor was carried out to make a low molecular weight polyethylene or medium molecular weight polyethylene. All of polymerized slurry polymer from first reactor was then transferred to a hydrogen removal unit to remove unreacted gas and some of hexane from polymer. The operating pressure in the hydrogen removal unit was be varied in a range of 100 to 115 kPa (abs) where residual hydrogen was removed more than 98% by weight but not more than 99.8% by weight from hexane before transferring to a second polymerization reactor. Some fresh hexane, ethylene and/or comonomer were fed into second reactor to produce first high molecular weight polyethylene (HMW1). All of polymerized polymer from second reactor was fed into the third reactor which produce second high molecular weight polyethylene (HMW2). Ethylene, comonomer, hexane and/or hydrogen were fed into the third reactor.

Screw Cap-Related Examples

The examples of polymer compositions for screw cap-related this invention regarding the multimodal polyethylenes were polymerized as shown in Table 1, 2, 3 and 4.

Comparative Example 1 (CE1)

A homopolymer was produced in first reactor to obtain a low molecular weight portion before transferring such polymer to hydrogen removal unit. Reactant mixture was introduced into the hydrogen removal unit to separate the unreacted mixture from the polymer. Residual hydrogen was removed 97.6% by weight when hydrogen removal unit was operated at pressure of 150 kPa (abs). The low molecular weight polymer was then transferred to the second reactor to produce a first high molecular weight polymer. Final, produced polymer from second reactor was transferred to the third reactor to create a second high molecular weight polymer. In third, a copolymerization was carried out by feeding 1-butene as a comonomer. As seen in Table 2 and 3, the final melt flow rate of CE1 were quite similar to a final melt flow rate of E1. A decay of charpy impact and flexural modulus were showed in CE1 compared to E1, even it showed lower density of E1.

Inventive Example 1 (E1)

Example 1 (E1) was carried out in the same manner as Comparative Example 1 (CE1) except that the hydrogen removal unit was operated at pressure of 115 kPa (abs). The residual of hydrogen from first reactor was removed to an extend of 98.5% by weight. The polymer obtained by this process operation had a melt flow rate of 48 g/10 min (5 kg loading) lower than such value obtained from CE1. As seen in Table 2, it revealed an improvement of stiffness-impact balance when the percentage of removed hydrogen residual increases compared with the properties of Comparative Example 1.

The properties of the invention from inventive examples E1 were compared to the properties of comparative examples CE1.

Comparative Example 2 (CE2)

Comparative example 2 (CE2) is a bimodal polyethylene produced from Ziegler-Natta catalyst. The weight ratio between the ethylene homopolymer and the ethylene copolymer is in the range of 45:55 to 55:45. A polymer composition comprises a comonomer in an amount of at least 0.40 mol %.

Comparative Example 3 (CE3)

Comparative example 3 (CE3) is a commercial multimodal high density polyethylene Hostalen® ACP5331 UVB plus.

Inventive Example 2 and 3 (E2 and E3)

Multimodal polyethylene compositions of inventive 2 and 3 (E2 and E3) were produced according to the inventive process with the polymerization condition as shown in Table 3. The different weight fraction in each reactor was defined and 1-butene was applied as comomoner in the $2^{nd}$ and $3^{rd}$ reactor components. The properties of the invention from inventive examples 2 and 3 (E2 and E3) were compared to the properties of comparative examples 2 and 3 (CE2 and CE3).

The characteristics and properties of these multimodal polyethylenes are shown in Table 4. The comparisons between the multimodal polymers, but different polymerization process were illustrated. Surprisingly, the multimodal polyethylene according to this invention which contain higher Mz and higher shear thinning shows a significant improvement in processability and stiffness of inventive examples 2 and 3 (E2 and E3) compare to comparative examples 2 and 3 (CE2, CE3) and Inventive examples 1 (E1) compare to comparative example 1 (CE1), respectively.

The better processability can be investigated in term of both faster cycle time and higher flowability. Faster cycle time was determined by the lower crystallization haft time (ICHT) and higher crystal growth rate (K). The inventive examples 1, 2, and 3 (E1, E2, and E3) show lower ICHT and higher crystal growth rate (K) than comparative examples 1, 2 and 3 (CE1, CE2 and CE3). It is supposed that the ultra high molecular weight produced in the second component following the inventive process can act as a stem for easier nucleation resulting in faster crystallization rate. The flowability is normally determined by spiral flow length at temperature 220° C. The spiral flow length of inventive example E1 has higher than comparative example 1 (CE1), and inventive example 2 and 3 (E2 and E3) have higher than comparative examples 2 and 3 (CE2 and CE3), even inventive examples have lower MI than comparative examples.

The improvement of stiffness compared to CE2 and CE3 were also investigated. The multimodal polyethylene composition of these invention example 2 (E2) have better flexural modulus than comparative examples 2 and 3 (CE2 and CE3) and also the invention example 1 (E1) has higher flexural modulus than comparative examples (CE1). Because of the multimodal polyethylene according to this invention contain higher Mz shows a significant improvement in stiffness.

This indicated that the inventive multimodal polyethylene composition provide better processability and higher stiffness with good balance to stress crack resistance beyond prior arts. The invention enhanced significantly improvement of properties for screw cap and closure.

TABLE 1

Polymerization conditions of multimodal polyethylenes for Screw cap-related invention in lab reactor

|  | CE1 | E1 |
|---|---|---|
| $W_A$, % | 50 | 50 |
| $W_B$, % | 10 | 10 |
| $W_C$, % | 40 | 40 |
| First reactor | | |
| Polymerization type | Homo | Homo |
| Temperature, ° C. | 80 | 80 |
| Total pressure, kPa | 800 | 800 |
| Ethylene, g | 725.21 | 725.57 |
| Hydrogen, g | 1.13 | 1.13 |

TABLE 1-continued

Polymerization conditions of multimodal polyethylenes
for Screw cap-related invention in lab reactor

|  | CE1 | E1 |
|---|---|---|
| Hydrogen removal unit | | |
| Pressure, kPa (abs) | 150 | 115 |
| Hydrogen remove, % | 97.7 | 98.5 |
| Second reactor | | |
| Polymerization type | Copo | Copo |
| Temperature, °C. | 80 | 80 |
| Total pressure, kPa | 300 | 300 |
| Ethylene, g | 145.35 | 145.21 |
| Hydrogen, g | 0 | 0 |
| 1-butene, g | 8 | 8 |
| Third reactor | | |
| Polymerization type | Copo | Copo |
| Temperature, °C. | 80 | 80 |
| Total pressure, kPa | 600 | 600 |
| Ethylene, g | 580.53 | 580.46 |
| Hydrogen, g | 0.59 | 1.37 |
| 1-butene, g | 27 | 27 |

$W_A$ means percent by weight of Polymer in the first reactor $W_B$ means percent by weight of Polymer in the second reactor $W_C$ means percent by weight of Polymer in the third reactor

TABLE 2

|  | CE1 | E1 |
|---|---|---|
| Powder | | |
| MI$_5$, g/10 min | 54.80 | 48.07 |
| MI$_{21}$, g/10 min | 641 | 653 |
| Density, g/cm$^3$ | 0.9606 | 0.9590 |
| IV, dl/g | 1.07 | 1.06 |
| Pellet | | |
| MI$_5$, g/10 min | 60.62 | 55.47 |
| MI$_{21}$, g/10 min | 713.1 | 752.2 |
| Density, g/cm$^3$ | 0.9608 | 0.9594 |
| IV, dl/g | 1.0 | 1.1 |
| % Crystallinity, % | 69.52 | 65.64 |
| Charpy, 23° C., kJ/m$^2$ | 1.5 | 1.8 |
| Flexural modulus, MPa | 1,147 | 1,196 |

TABLE 3

Polymerization conditions of multimodal polyethylenes
for Screw cap-related invention from pilot scale

| Process Parameters | Unit | E2 (Inventive) | E3 (Inventive) |
|---|---|---|---|
| 1$^{st}$ Reactor | | | |
| Split ratio | % | 58-62 | 48-52 |
| Temperature | (° C.) | 81-85 | 81-85 |
| Pressure | Bar | 5.5-6.0 | 4.5-5.0 |
| Hexane flow rate | L/h | 90.0 | 63.0 |
| Ethylene flow rate | L/h | 2310.5 | 1918.0 |
| Hydrogen flow rate | NL/h | 188.1 | 104.336 |
| Catalyst flow rate | g/h | 3.2 | 3.1 |
| 2$^{nd}$ Reactor | | | |
| Split ratio | % | 9-10 | 12-18 |
| Temperature | (° C.) | 68-70 | 68-70 |
| Pressure | Bar | 1.5-3.0 | 1.5-3.0 |
| Hexane flow rate | L/h | 176.2 | 148.7 |
| Ethylene flow rate | L/h | 1051.0 | 1354 |
| Hydrogen flow rate | NL/h | 0 | 0 |
| Comonomer/Ethylene Feed | — | 0.0037 | 0.00239 |
| H$_2$ removal | | 98.89 | 98.99 |
| Flash pressure | | 0.054 | 0.056 |
| Comonomer type | — | 1-Butene | 1-Butene |
| 3$^{rd}$ Reactor | | | |
| Split ratio | % | 28-33 | 32-38 |
| Temperature | (° C.) | 70-75 | 70-75 |
| Pressure | Bar | 1.5-3.0 | 1.5-3.0 |
| Hexane flow rate | L/h | 191.6 | 164.0 |
| Ethylene flow rate | L/h | 1980.2 | 1969.3 |
| Hydrogen flow rate | NL/h | 39.8 | 0 |
| Comonomer/Ethylene Feed | — | 0.002 | 0.00849 |
| Production rate | kg/h | 30.0 | 25.0 |
| Comonomer type | — | 1-Butene | 1-Butene |

TABLE 4

Polymer compositions and properties of multimodal polyethylenes (pellet)
for Screw cap-related invention

| Properties | E1 Inventive | CE1 Comparative | E2 Inventive | E3 Inventive | CE2 Comparative | CE3 Comparative |
|---|---|---|---|---|---|---|
| MI$_2$ [g/10 min] | 14.6 | 16.8 | 0.8 | 0.5 | 0.9 | 2.0 |
| MI$_5$ [g/10 min] | 55.47 | 60.62 | 3.16 | 2.12 | 3.61 | 6.54 |
| Density [g/cm$^3$] | 0.9594 | 0.9608 | 0.9603 | 0.9582 | 0.9584 | 0.9574 |
| IV [cm$^3$/g] | 1.10 | 1.01 | 2.01 | 2.39 | 1.98 | 1.12 |
| Mn [g/mol] | 6,065 | 7,036 | 9,600 | 9,393 | 8,847 | 13,459 |
| Mw [g/mol] | 85,150 | 81,171 | 174,712 | 183,319 | 157,896 | 119,848 |
| Mz [g/mol] | 713,636 | 677,966 | 1,359,161 | 1,436,240 | 1,058,549 | 765,341 |
| PDI | 14 | 12 | 18 | 20 | 18 | 9 |
| Comonomer content [% mol] | 0.83 | 0.67 | 0.43 | 0.52 | 0.50 | 0.36 |
| ICHT @ 123° C. [min] | 3.1 | 3.2 | 4.1 | 6.1 | 8.2 | 8.7 |
| Crystal growth rate constant (K) | 1.68E−05 | 1.19E−05 | 2.7E−06 | 1.21E−06 | 1.4E−07 | 5.8E−07 |

TABLE 4-continued

Polymer compositions and properties of multimodal polyethylenes (pellet) for Screw cap-related invention

| Properties | E1 Inventive | CE1 Comparative | E2 Inventive | E3 Inventive | CE2 Comparative | CE3 Comparative |
|---|---|---|---|---|---|---|
| Tm [° C.] | 130 | 130 | 130 | 129 | 130 | 130 |
| Tc [° C.] | 118 | 118 | 119 | 118 | 117 | 117 |
| % Crystallinity | 66 | 66 | 73 | 66 | 69 | 67 |
| SHI (1/100) | 12.2 | 7.0 | 23.4 | 26.1 | 11.4 | 3.9 |
| $\eta_{0.01}$ [Pa · s] | 2,176 | 1,283 | 27,870 | 38,907 | 20,343 | 6,873 |
| Spiral flow length @ 220° C. [mm] | 350 | 340 | 293 | 282 | 266 | 238 |
| Flexural modulus (ISO 178) [MPa] | 1,196 | 1,147 | 1,251 | 1,258 | 1,157 | 1,141 |
| FNCT (ISO 16770) @ 50° C., 6 MPa, 2% wt Arkopal [hr] | N/A | N/A | 17 | 22 | 18 | 8 |

The invention claimed is:

1. A multimodal polyethylene composition comprising;
   (A) 35 to 65 parts by weight of a low molecular weight polyethylene having a weight average molecular weight (Mw) of 20,000 to 90,000 g/mol;
   (B) 5 to 40 parts by weight of a first high molecular weight polyethylene having a weight average molecular weight (Mw) of more than 150,000 to 1,000,000 g/mol or a first ultra high molecular weight polyethylene having a weight average molecular weight (Mw) of more than 1,000,000 to 5,000,000 g/mol; and
   (C) 20 to 60 parts by weight of a second high molecular weight polyethylene having a weight average molecular weight (Mw) of more than 150,000 to 1,000,000 g/mol or a second ultra high molecular weight polyethylene having a weight average molecular weight (Mw) of more than 1,000,000 to 5,000,000 g/mol,
   wherein the molecular weight distribution of the multimodal polyethylene composition is from 10 to 25, determined by Gel Permeation Chromatography;
   the isothermal crystallization half-time of the multimodal polyethylene composition at a temperature of 123° C. is 7 min or less, according to Differential Scanning Calorimetry;
   a spiral flow length at a temperature of 220° C. is at least 200 mm, and
   wherein (A), (B), and (C) each have a different weight average molecular weight.

2. The multimodal polyethylene composition according to claim 1, wherein the molecular weight distribution is from 15 to 25.

3. The multimodal polyethylene composition according to claim 1, wherein the spiral flow length at a temperature of 220° C. is from 250 to 370 mm.

4. The multimodal polyethylene composition according to claim 1, wherein the multimodal polyethylene composition has an average molecular weight from 80,000 to 250,000 g/mol, measured by Gel Permeation Chromatography.

5. The multimodal polyethylene composition according to claim 1, wherein the multimodal polyethylene composition has a number average molecular weight from 5,000 to 30,000 g/mol, measured by Gel Permeation Chromatography.

6. The multimodal polyethylene composition according to claim 1, wherein the multimodal polyethylene composition has a Z average molecular weight from 700,000 to 2,500,000 g/mol, measured by Gel Permeation Chromatography.

7. The multimodal polyethylene composition according to claim 1, wherein the multimodal polyethylene composition has a density 0.950 to 0.965 g/cm3, according to ASTM D 1505 and/or MI$_2$ from 0.1 to 20 g/10 min, according to ASTM D 1238.

8. Screw cap comprising the multimodal polyethylene composition according to claim 1.

9. Screw cap according to claim 8 obtainable by injection molding or compression molding.

10. The multimodal polyethylene composition of claim 1, comprising 45 to 65 parts by weight of the low molecular weight polyethylene.

11. The multimodal polyethylene composition of claim 1, comprising 5 to 30 parts by weight of the first high molecular weight polyethylene.

12. The multimodal polyethylene composition of claim 1, comprising 25 to 60 parts by weight of the second high molecular weight polyethylene.

13. The multimodal polyethylene composition of claim 1, wherein the molecular weight distribution of the multimodal polyethylene composition is from 10 to 20, determined by Gel Permeation Chromatography.

14. The multimodal polyethylene composition of claim 1, wherein the molecular weight distribution of the multimodal polyethylene composition is from 10 to 20, determined by Gel Permeation Chromatography.

15. The multimodal polyethylene composition of claim 1, wherein the isothermal crystallization half-time at a temperature of 123° C. is 6 min or less.

16. The multimodal polyethylene composition of claim 1, wherein the spiral flow length at a temperature of 220° C. is 250-400 mm.

17. The multimodal polyethylene composition of claim 4, wherein the average molecular weight is from 80,000 to 200,000 g/mol, measured by Gel Permeation Chromatography.

18. The multimodal polyethylene composition of claim 5, wherein the number average molecular weight is from 5,000 to 20,000 g/mol, measured by Gel Permeation Chromatography.

19. The multimodal polyethylene composition of claim 6, wherein the Z average molecular weight is from 700,000 to 2,000,000 g/mol, measured by Gel Permeation Chromatography.

20. The multimodal polyethylene composition of claim 7, wherein the density is 0.953 to 0.960 g/cm3 according to ASTM D 1505 and/or MI$_2$ is from 0.3 to 17 g/10 min, according to ASTM D 1238.

* * * * *